United States Patent
White et al.

(10) Patent No.: US 9,635,418 B2
(45) Date of Patent: *Apr. 25, 2017

(54) SYSTEMS AND METHODS FOR SEARCHING BASED ON INFORMATION IN COMMERCIALS

(71) Applicant: AT&T INTELLECTUAL PROPERTY I, L.P., Atlanta, GA (US)

(72) Inventors: Scott White, Austin, TX (US); James Cansler, Pflugerville, TX (US); Charles V. Scott, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,090

(22) Filed: Sep. 6, 2016

(65) Prior Publication Data

US 2016/0373815 A1 Dec. 22, 2016

Related U.S. Application Data

(63) Continuation of application No. 14/642,823, filed on Mar. 10, 2015, which is a continuation of application No. 14/280,959, filed on May 19, 2014, now Pat. No. 9,009,751, which is a continuation of application No. 12/107,886, filed on Apr. 23, 2008, now Pat. No. 8,763,024.

(51) Int. Cl.
| | | |
|---|---|---|
| *H04H 20/14* | (2008.01) | |
| *H04H 60/29* | (2008.01) | |
| *H04N 21/44* | (2011.01) | |
| *H04N 21/442* | (2011.01) | |
| *H04N 21/84* | (2011.01) | |
| *H04N 21/482* | (2011.01) | |
| *H04N 21/433* | (2011.01) | |

(52) U.S. Cl.
CPC ... *H04N 21/44008* (2013.01); *H04N 21/4334* (2013.01); *H04N 21/44222* (2013.01); *H04N 21/4821* (2013.01); *H04N 21/4826* (2013.01); *H04N 21/84* (2013.01)

(58) Field of Classification Search
CPC ............. H04N 21/442; H04N 21/4331; H04N 21/4334; H04N 21/44008; H04N 21/44222; H04N 21/812; H04N 21/84
See application file for complete search history.

(56) References Cited

U.S. PATENT DOCUMENTS

| | | |
|---|---|---|
| 6,100,941 A | 8/2000 | Dimitrova |
| 6,874,160 B1 | 3/2005 | Herz |
| 7,089,575 B2 | 8/2006 | Agnihotri |
| 7,213,256 B1 | 5/2007 | Kikinis |
| 7,305,692 B2 | 12/2007 | Blackketter |

(Continued)

*Primary Examiner* — Yassin Alata
(74) *Attorney, Agent, or Firm* — Guntin & Gust, PLC; Atanu Das

(57) ABSTRACT

A system that incorporates teachings of the subject disclosure may include, for example, determining that a commercial segment of media content, including a video portion and an audio portion, contains neither metadata nor close captioning information. I response to determining that the commercial segment contains neither metadata nor close captioning information, advertised program content is identified based on the video portion, the audio portion or both. Alternative media content is identified based on the advertised program content. Other embodiments are disclosed.

20 Claims, 6 Drawing Sheets

(56) References Cited

U.S. PATENT DOCUMENTS

| | | |
|---|---|---|
| 7,421,723 B2 | 9/2008 | Harkness |
| 2005/0196136 A1 | 9/2005 | Blackketter |
| 2006/0026647 A1 | 2/2006 | Potrebic |
| 2006/0130102 A1 | 6/2006 | Matero |
| 2006/0136980 A1 | 6/2006 | Fulcher |
| 2006/0150218 A1 | 7/2006 | Lazar |
| 2007/0039020 A1 | 2/2007 | Cansler |
| 2009/0158350 A1 | 6/2009 | DeCamp |

SYSTEMS AND METHODS FOR SEARCHING BASED ON INFORMATION IN COMMERCIALS

CROSS-REFERENCE TO RELATED APPLICATIONS

This application is a Continuation of and claims priority to U.S. patent application Ser. No. 14/642,823, filed Mar. 10, 2015, which is a Continuation of U.S. patent application Ser. No. 14/280,959, filed May 19, 2014, which is a Continuation of and claims priority to U.S. patent application Ser. No. 12/107,886, filed Apr. 23, 2008 (now issued as U.S. Pat. No. 8,763,024). The contents of each of the foregoing is/are hereby incorporated by reference into this application as if set forth herein in full.

FIELD OF THE DISCLOSURE

The present disclosure generally relates to communications networks, and more particularly relates to systems and methods for searching based on information in commercials.

BACKGROUND OF THE DISCLOSURE

When watching television, viewers enjoy a variety of channel and viewing options. An Electronic Programming Guide (EPG) allows the viewer to see broadcast schedules for available channels. To better aid in identifying programming, the EPG may also provide descriptions of scheduled shows. Further, the EPG may provide the viewer with extended broadcast schedules, such as over the next days or weeks, allowing the viewer to identify content for later viewing or recording.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
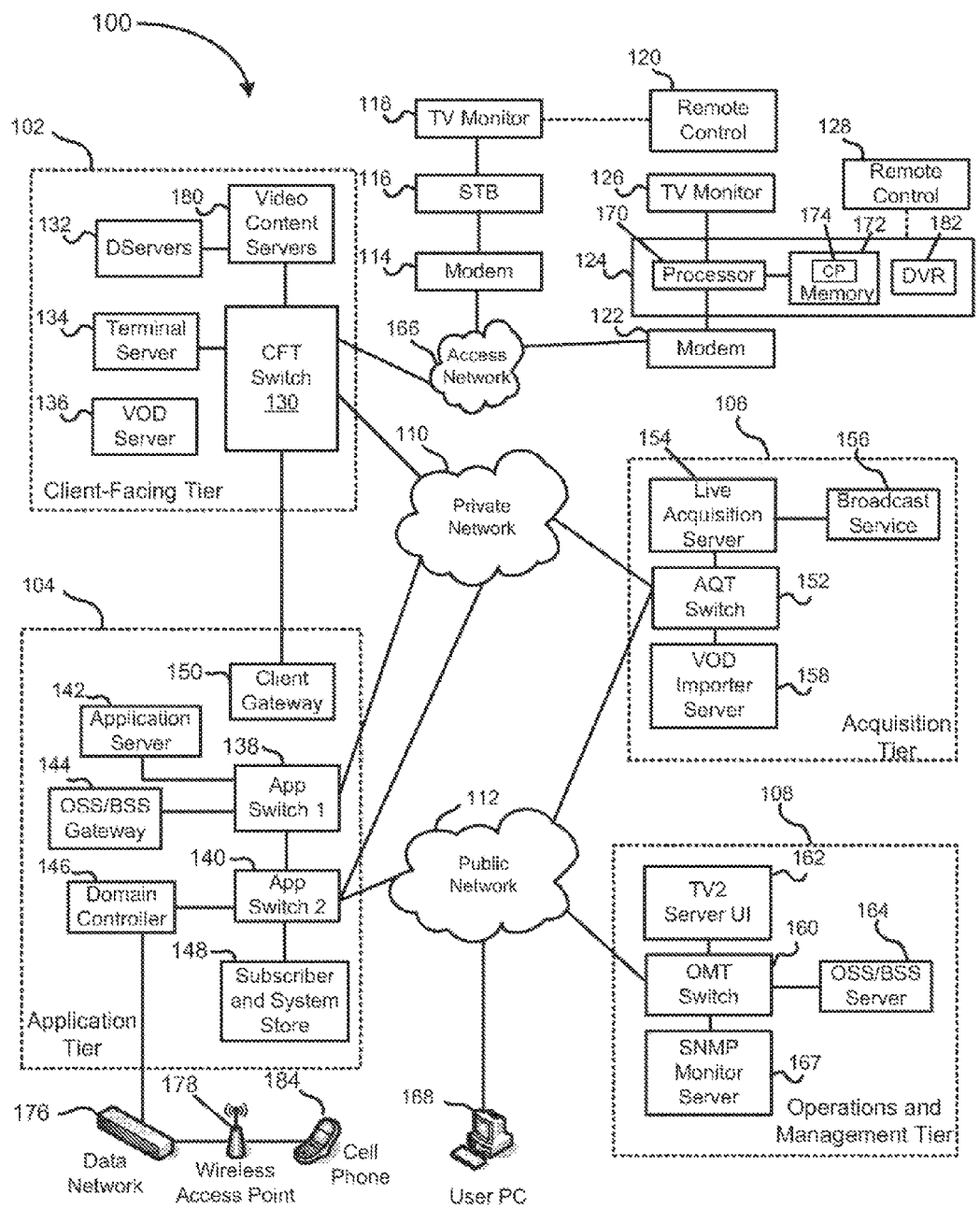
FIG. 1 is a block diagram illustrating an Internet Protocol Television (IPTV) network in accordance with one embodiment of the present disclosure.

FIG. 1 shows an Internet Protocol Television (IPTV) system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
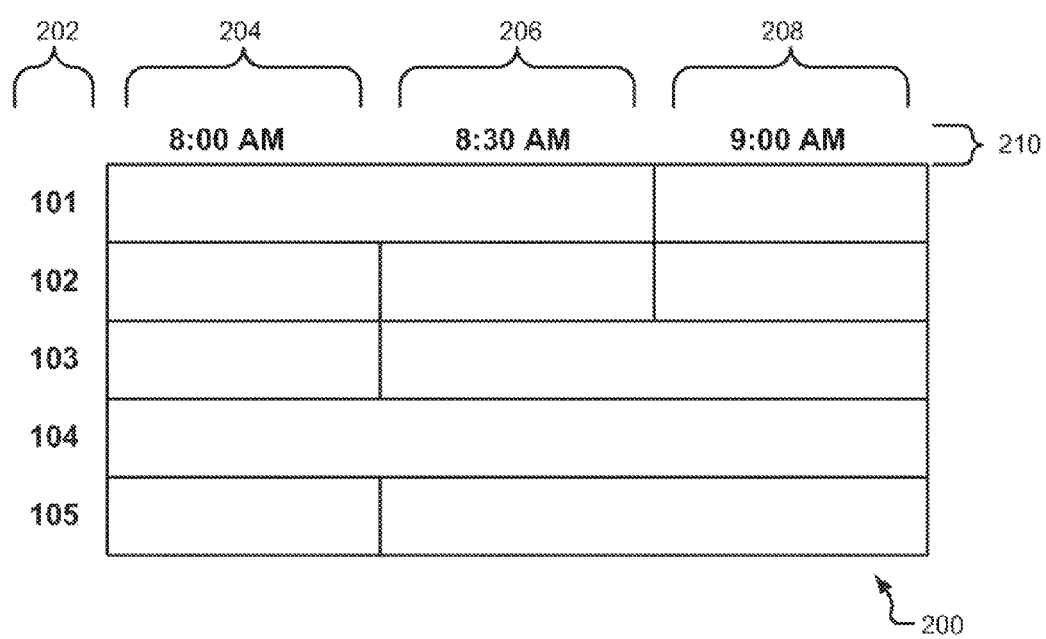
FIG. 2 is a schematic view of an exemplary electronic programming guide.

FIG. 2 shows an exemplary embodiment of an electronic programming guide (EPG) 200. The EPG 200 provides television viewers with on-screen television schedule information. EPG 200 may also include additional information, such as advertisements, detailed program descriptions, programming, or any combination thereof. The programming information is preferably displayed in a grid format, including columns 202 through 208. Column 202 displays the various channels. The list of channels may include all channels available, only those channels to which the viewer is subscribed, or a subset of favorite channels preselected by the viewer. Columns 204, 206, and 208 can indicate what is showing on the channels listed in column 202 in half hour increments. For example, titles of programs can be displayed within the columns 204, 206, and 208. Additionally, a brief description of the program may be displayed. For programs spanning multiple half hour increments, the title and description may be displayed across more than one of columns 204, 206, and 208. The time corresponding to the half hour increments is displayed in a row 210 across the top of EPG 200. Typically, more channels are available than can be shown at one time. Accordingly, the grid may be scrolled up or down through additional channels. Further, a user may scroll the grid to the left or right to view programming choices at different times.

Figure 3:
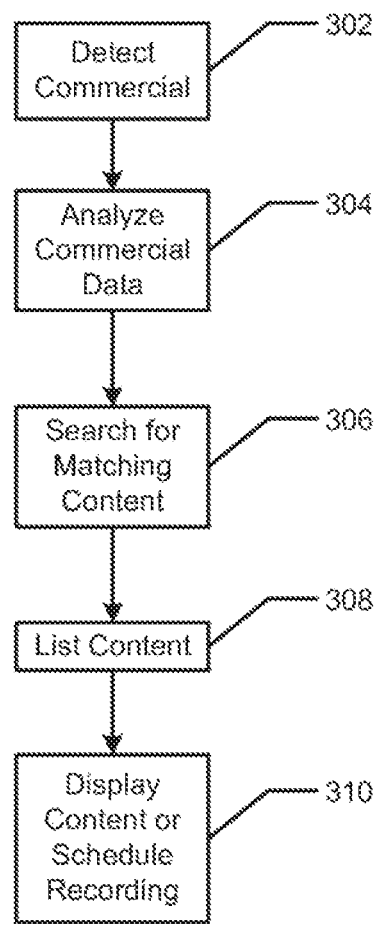
FIGS. 3 and 4 are flow diagram illustrating exemplary methods of identifying programming content.

FIG. 3 illustrates an exemplary method of searching for programming content based on information within a television commercial. At 302, an STB such as STB 116 can detect a commercial. Various techniques are known in the art to identify the beginning and end of television commercials. At 304, the STB can analyze the commercial data to identify an advertised programming. In an exemplary embodiment, the commercial may be a network advertisement promoting a movie or television series to be broadcast on the network later in time. In an alternate embodiment, the commercial may be a studio commercial advertising a movie that is soon to be available by VoD or download. In yet another embodiment, the commercial may be an advertisement promoting for-pay programming, such as a boxing match that is available as PPV.

The STB can identify the title of the programming or other identifying information, such as an actor or director associated with the programming, based on the content of the commercial. In an embodiment, the commercial can include metadata that includes identifying information. In another embodiment, the commercial may not include metadata and the STB can extract the identifying information from audio and video portions of the commercial. In an alternate embodiment, the commercial as provided by a source, such as the studio or the broadcast network, may not include metadata. Network servers, such as video content servers 180 or live acquisition server 154, may extract the identifying information from the audio and video portions of the commercial. Alternatively, the network servers may match a commercial signature to a database to determine the identifying information. Metadata, including the identifying information, may be added to the commercial prior to delivery to the STB.

At 306, the STB can search for content matching the identifying information. For example, the series may search the available EPG for occurrences of a series advertised by the commercial. In another example, the STB may search a content database, such as a VoD database or a database of content available for download, to determine if a movie advertised by a commercial is available. At 308, the STB may provide a list of content matching the identifying information. In an embodiment, the STB may display a dialog box indicating that matching content is available. A viewer may select to see a list of available content and the STB may provide information about the matching content, such as the source and a time it is available. The information may also include a cost and identify commercial-free content. At 310, the STB can begin playback of currently available content or schedule a recording for content available at a later time. Additionally, the STB may provide an option to set up a recurring recording for regularly scheduled series.

Figure 4:
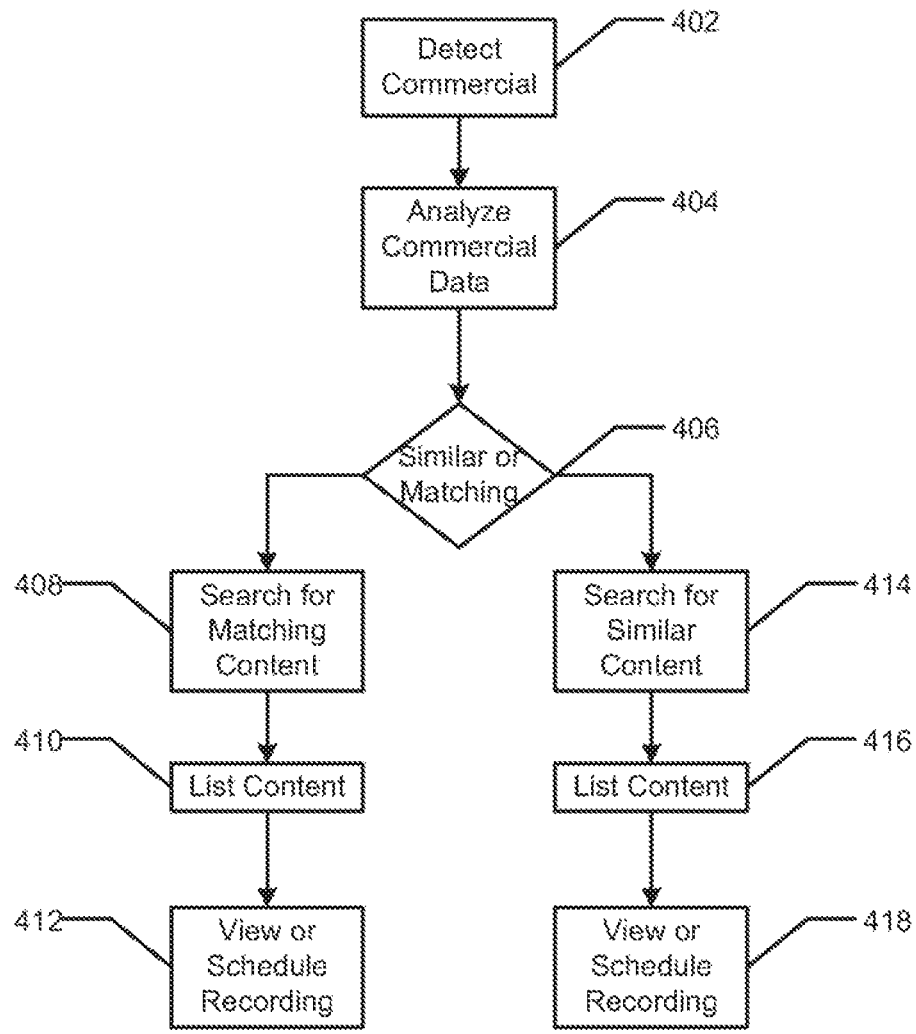

FIG. 4 illustrates an exemplary method of searching for programming content based on information within a television commercial. At 402, an STB such as STB 116 can detect a commercial. At 404, the STB can analyze the commercial data for identifying information. The identifying information can include a title, a broadcast time, and channel, or other information such as genre. The identifying information can be determined from metadata associate with the commercial or from a video or audio portion of the commercial.

At 406, the STB can provide an option to search for the advertised content or content similar to the advertised content. At 408, a viewer may choose to search for the advertised content. For example, the commercial may be advertising a series premiere to be broadcast later in the week. The STB may identify the content based on the title of the series, the channel that will broadcast the series, and the time the series is scheduled for broadcast. The STB may also search a database of content to determine if the series will be available for download. At 410, the STB may display viewing choices to the user. The display may include the title of the content, when the content will be available, and an option to view or record the content when it is available. In an embodiment, a series scheduled for broadcast may also be provided as a downloadable purchase. The display may list both the scheduled broadcast and the option to download the content. For a downloadable series, the STB may provide the option to purchase and later download an entire season as episodes become available. The viewer may choose a preferred source of the content. At 412, the STB can begin playback of currently available content or schedule a recording for content available at a later time. Additionally, the STB may set up a recurring recording for regularly scheduled series.

Returning to 406, a viewer may choose to search the EPG and content databases for related content, as illustrated at 414. In an embodiment, the commercial may be advertising a movie soon to be in theaters. Related content may include content having a similar genre or content associated with an actor or director involved in the advertised movie. Additionally, if the movie is a sequel or a remake, related content may include previous movies. In another embodiment, the commercial may be advertising a product, such as a book. Related content may include adaptations of the author's previous books or movies and series with which the author is associated. In yet another embodiment, the commercial may be advertising a product line, such as a clothing line, named after or endorsed by an actor. Related content may include programs with which the actor is associated.

At 416, the STB may display the related content to the user. The display may include the title of the related content, when the related content will be available, and an option to view or record the related content when it is available. At 418, the STB can begin playback of currently available related content or schedule a recording for related content available at a later time. In an embodiment, the STB may download related content available for purchase or rental.

Figure 5:
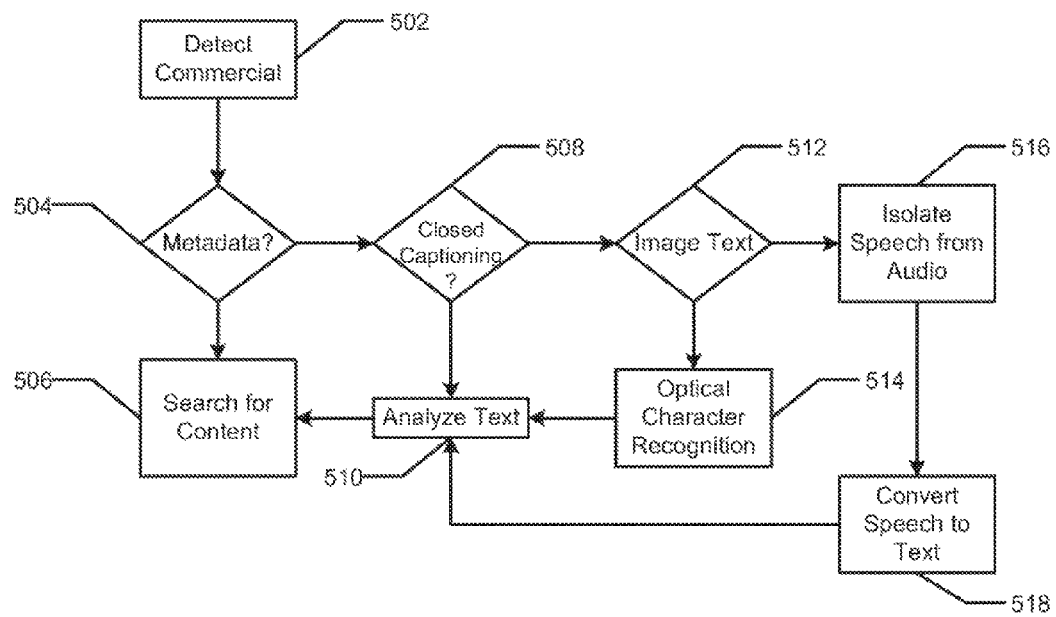
FIG. 5 is a flow diagram illustrating an exemplary method for obtaining information from a commercial.

FIG. 5 illustrates an exemplary method for analyzing commercial data to obtain identifying information. At 502, a STB may detect a commercial. At 504, the STB may determine if metadata is associated with the commercial. When metadata is associated with the commercial, the STB can extract identifying information related to the commercial from the metadata. The identifying information may include a title, a genre, a list of people associated with the advertised product, or similar information. At 506, the STB can use the identifying information to search for content related to the commercial.

Returning to 504, when there is no metadata associated with the commercial, the STB may determine if the commercial includes closed captioning information, as illustrated at 508. When the commercial includes closed captioning information, the STB may analyze text extracted from the closed captioning information, as illustrated at 510. For example, a commercial advertising a television series may contain closed captioning information including the title of the series and the time and channel of the scheduled broadcast. At 506, the STB can use the identifying information to search for content related to the commercial.

At 512, when there is no closed captioning information associated with the commercial, the STB may determine if a video portion of the commercial includes text. For example, a commercial advertising a broadcast program may include text indicating a channel and time for the broadcast. At 514, when the video portion of the commercial includes text, the STB may utilize optical character recognition software to extract the text from the video portion of the commercial. At 510, the text extracted from the video portion of the commercial may be analyzed to obtain identifying information.

At 516, when the video portion of the commercial does not include text, the STB may isolate speech form the audio portion of the commercial. For example, an announcer may identify a title, a broadcast time, and a broadcast channel for a made-for-TV movie being advertised by the commercial. At 518, the STB may utilize speech recognition software to convert the speech to text. Various techniques are known in the art for speech recognition. At 510, the text extracted from the video portion of the commercial may be analyzed to obtain identifying information.

In an alternate embodiment, network servers, such as video content servers 180 or live acquisition server 154, may detect the commercial and extract identifying information from the commercial. The network servers may provide the identifying information to the STB so that the STB can search for related content. Alternatively, the network servers may search for the related content and provide a list of related content to the STB. The STB may compare the list of related content to a set of subscription options to provide the viewer with a list of available related content.

In another embodiment, network servers may provide a database of identifying information to the STB. The STB may use a signature of the commercial, such as a hash of the digital information, to access identifying information related to the commercial from the database.

Figure 6:
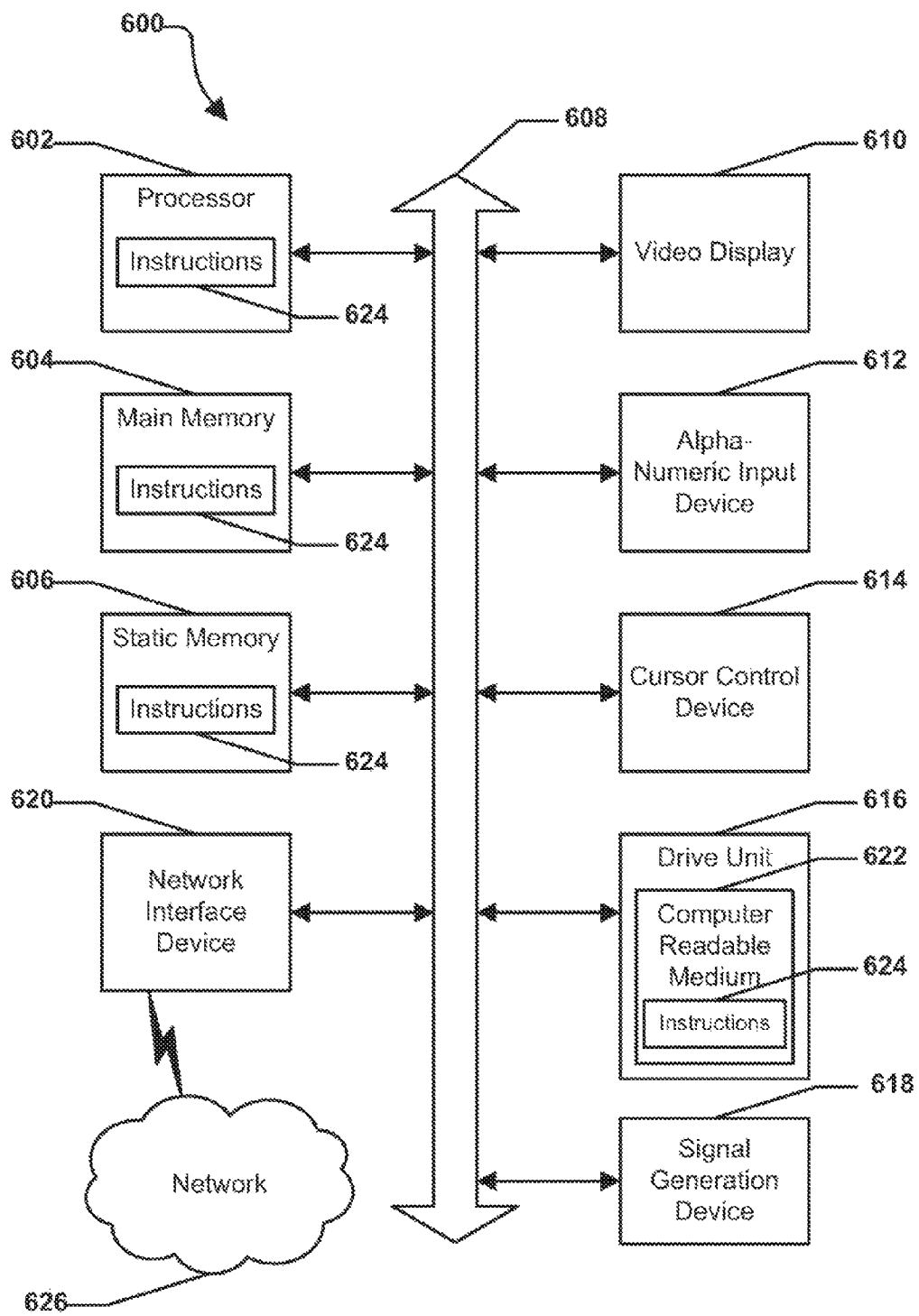
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device comprising:
   a processing system including a processor; and
   a memory that stores executable instructions that, when executed by the processing system, facilitate performance of operations comprising:
      receiving media content from a media content server, wherein the media content comprises a commercial segment;
      detecting the commercial segment within the media content;
      determining that the commercial segment of the media content comprising a video portion and an audio portion contains neither metadata nor close captioning information;
      analyzing one of the video portion and the audio portion to identify information including one of a title, a genre, and a list of people associated with an advertised program content resulting in identified information;
      in response to determining that the commercial segment contains neither metadata nor close captioning information, identifying advertised program content based on the identified information;
      searching an electronic programming guide for availability of alternative media content based on the advertised program content;
      identifying the alternative media content based on the advertised program content; and
      presenting a list of the alternative media content on a display device.

2. The device of claim 1, wherein the identifying of the advertised program content comprises:
   determining, from the video portion, the audio portion or both, a signature of the commercial segment, wherein the signature comprising a hash of digital information;
   comparing the signature to a database; and
   obtaining identifying information based on the comparing of the signature to the database.

3. The device of claim 1, wherein the identifying of the advertised program content comprises:
   isolating speech from the audio portion of the commercial segment;

converting the speech to text information; and
analyzing the text information to identify the advertised program content.

4. The device of claim 1, wherein the identifying of the advertised program content comprises:
performing optical character recognition on the video portion of the commercial segment
extracting textual content from the video portion; and
analyzing the textual content to identify the advertised program content.

5. The device of claim 1, wherein the list of the alternative media content includes a list of viewing choices, wherein the list of viewing choices comprise one of video on demand, download for later playback, and schedule recording of future showings.

6. The device of claim 1, wherein the list of the alternative media content includes a list of published material related to the advertised program content.

7. The device of claim 1, wherein the list of the alternative media content includes a list of commercials for products related to a person associated with the advertised program content.

8. A machine-readable storage device, comprising executable instructions that, when executed by a processing system including a processor, facilitate performance of operations, comprising:
obtaining media content from a media content server, wherein the media content comprises an advertisement;
identifying the advertisement within the media content;
determining that the advertisement within a media program comprising a video portion and an audio portion contains neither metadata nor close captioning information;
analyzing one of the video portion, the audio portion or both to identify information including a title, a genre, a list of people associated with an advertised media content resulting in identified information;
in response to determining that the advertisement contains neither metadata nor close captioning information, identifying the advertised media content based on the identified information;
searching an electronic programming guide for availability of alternative media content based on the advertised media content
determining the alternative media content based on the advertised media content; and
providing a list of the alternative media content on a display device.

9. The machine-readable storage device of claim 8, wherein the identifying of the advertised media content comprises:
determining, from the video portion, the audio portion or both, a signature of the advertisement, wherein the signature comprising a hash of digital information;
comparing the signature to a database; and
obtaining identifying information based on the comparing of the signature to the database.

10. The machine-readable storage device of claim 8, wherein the identifying of the advertised media content comprises:
isolating speech from the audio portion of the advertisement;
converting the speech to text information; and
analyzing the text information to identify the advertised media content.

11. The machine-readable storage device of claim 8, wherein the identifying of the advertised media content comprises:
performing optical character recognition on the video portion of the advertisement
extracting textual content from the video portion; and
analyzing the textual content to identify the advertised media content.

12. The machine-readable storage device of claim 8, wherein the list of the alternative media content includes a list of viewing choices, wherein the list of viewing choices comprise one of video on demand, download for later playback, and schedule recording of future showings.

13. The machine-readable storage device of claim 8, wherein the list of the alternative media content includes a list of published material related to the advertised media content.

14. The machine-readable storage device of claim 8, wherein the list of the alternative media content includes a list of commercials for products related to a person associated with the advertised media content.

15. A method, comprising:
receiving, by a processing system comprising a processor, a multimedia signal from a multimedia server, wherein the multimedia signal comprises an advertisement;
detecting, by the processing system, the advertisement within the multimedia signal;
determining, by the processing system, that the advertisement within the multimedia signal comprising a video portion and an audio portion contains neither metadata nor close captioning information;
analyzing, by the processing system, one of the video portion and the audio portion to identify information including a title, a genre, a list of people associated with an advertised media content resulting in identified information.
identifying, by the processing system, advertised media content based on the identified information, in response to determining that the advertisement contains neither metadata nor close captioning information;
searching, by the processing system, an electronic programming guide for availability of alternative media content based on the advertised media content;
determining, by the processing system, the alternative media content based on the advertised media content; and
displaying, by the processing system, a list of the alternative media content on a display device.

16. The method of claim 15, wherein the identifying of the advertised media content comprises:
determining, by the processing system, from the video portion, the audio portion or both, a signature of the advertisement, wherein the signature comprising a hash of digital information;
comparing, by the processing system, the signature to a database; and
obtaining, by the processing system, identifying information based on the comparing of the signature to the database.

17. The method of claim 15, wherein the identifying of the advertised media content comprises:
isolating, by the processing system, speech from the audio portion of the advertisement;
converting, by the processing system, the speech to text information; and
analyzing, by the processing system, the text information to identify the advertised media content.

18. The method of claim 15, wherein the identifying of the advertised media content comprises:
    performing, by the processing system, optical character recognition on the video portion of the advertisement;
    extracting, by the processing system, textual content from the video portion; and
    analyzing, by the processing system, the textual content to identify the advertised media content.

19. The method of claim 15, wherein the list of the alternative media content includes a list of viewing choices, wherein the list of viewing choices comprise one of video on demand, download for later playback, and schedule recording of future showings.

20. The method of claim 15, wherein the list of the alternative media content includes a list of published material related to the advertised media content.

\* \* \* \* \*